United States Patent
Fischer et al.

(10) Patent No.: US 6,651,999 B1
(45) Date of Patent: Nov. 25, 2003

(54) MODULE WITH AN ANGLE SENSOR TECHNOLOGY, CONTACTLESS ENERGY TRANSMISSION AND CONTACTLESS INFORMATION TRANSMISSION

(75) Inventors: Roland Fischer, Nidderau (DE); Reinhard Seyer, Rodgau (DE)

(73) Assignee: DaimlerChrysler AG, Stuttgart (DE)

( * ) Notice: Subject to any disclaimer, the term of this patent is extended or adjusted under 35 U.S.C. 154(b) by 1 day.

(21) Appl. No.: 10/089,457

(22) PCT Filed: Sep. 9, 2000

(86) PCT No.: PCT/EP00/08818

§ 371 (c)(1),
(2), (4) Date: Jun. 11, 2002

(87) PCT Pub. No.: WO01/23243

PCT Pub. Date: Apr. 5, 2001

(30) Foreign Application Priority Data

Sep. 30, 1999 (DE) .......................................... 199 46 934

(51) Int. Cl.$^7$ ................................................. G01B 7/30
(52) U.S. Cl. ...................... 280/731; 280/5.51; 180/400; 701/41
(58) Field of Search ................................. 280/731, 734, 280/735, 5.5, 5.51; 307/10.1; 180/400; 701/41

(56) References Cited

U.S. PATENT DOCUMENTS

| | | | | |
|---|---|---|---|---|
| 4,829,247 A | * | 5/1989 | Wallrafen | 324/207.12 |
| 5,383,679 A | * | 1/1995 | Nakamura et al. | 280/5.507 |
| 5,401,052 A | * | 3/1995 | Yoshioka et al. | 280/5.503 |
| 5,636,863 A | * | 6/1997 | Reid et al. | 280/735 |
| 5,856,710 A | * | 1/1999 | Baughman et al. | 307/10.1 |
| 6,236,119 B1 | * | 5/2001 | Bonn et al. | 307/10.1 |
| 6,554,303 B2 | * | 4/2003 | Benz et al. | 280/93.5 |
| 2003/0132584 A1 | * | 7/2003 | Borroni-Bird et al. | 280/5.5 |

FOREIGN PATENT DOCUMENTS

| | | |
|---|---|---|
| DE | 0 849 121 A1 | 6/1998 |
| WO | WO 97/38876 | 10/1997 |

* cited by examiner

*Primary Examiner*—Yvonne Abbott
(74) *Attorney, Agent, or Firm*—Venable LLP; Norman N. Kunitz

(57) ABSTRACT

A module having an angle-sensor mechanism, an energy-transmission device and an information-transmission device comprises at least two circuit boards (1, 2). One circuit board (1) forms the stator with respect to the angle-sensor mechanism, while the other board (2) forms the rotor with respect to the mechanism. The stator includes the primary coil for the angle-sensor mechanism, as well as an exciting coil for the transmission of energy and information. The rotor includes the secondary coil of the angle-sensor mechanism, as well as a receiver coil, for the transmission of energy and information. The exciting coil and the receiver coil are disposed in circular fashion on the respective circuit board, thereby creating a coupling for the exciting coil and the receiver coil that is independent of the angle. The exciting coil and the receiver coil are used for transmitting both energy and information. The energy transmission is typically effected with a medium frequency of, for example, 25 kHz. A modulation is superposed on this medium frequency for transmitting information. Various modulation methods are feasible, such as HF (high-frequency) modulation, amplitude modulation or phase modulation.

15 Claims, 4 Drawing Sheets

Figure 1:
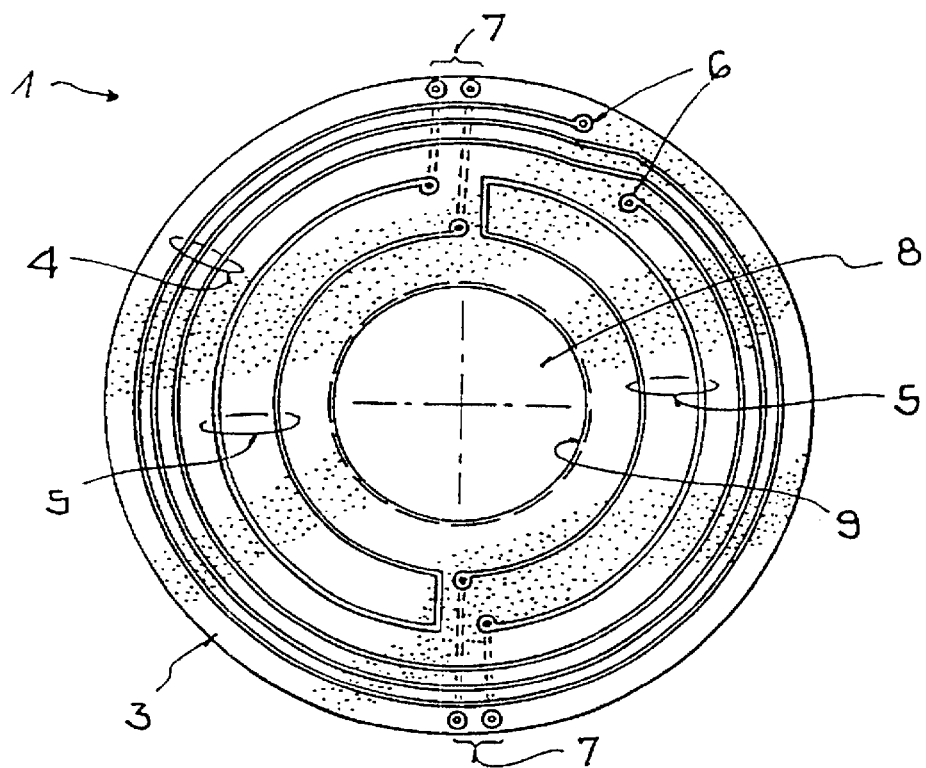

MODULE WITH AN ANGLE SENSOR TECHNOLOGY, CONTACTLESS ENERGY TRANSMISSION AND CONTACTLESS INFORMATION TRANSMISSION

The invention relates to a module, particularly a steering-wheel module, that unifies three functional groups, namely an energy-transmission device, an information-transmission device and an angle-sensor mechanism, in a compact, two-part component.

The basic model of inductive position or angle sensors according to the transformer principle comprises at least two conductor loops, one of which is operated as a transmitter or primary coil, while the other serves as a receiver or secondary coil. If the secondary coil is guided past the primary coil, a secondary voltage that is dependent on the position of the primary coil relative to the secondary coil is obtained in the transformer formed by the primary coil and the secondary coil with variable coupling. Special embodiments of these sensors operate with short-circuited secondary coils. In these sensors, the angle-dependent feedback of the short-circuited secondary coil to the primary coil is measured. The very low resistance of the secondary winding that is present with a short-circuit manifests itself in the primary circuit as a transformer ratio for resistances that is modified by the variable mutual inductance. The company of Hella KG Hueck & Co. distributes an accelerator-pedal sensor for use in motor vehicles, which is described, for example, in the ATZ Automobiltechnische Zeitschrift [Automotive Technology Journal] 100 (1998), No. 10.

It is therefore the object of the invention to expand the function of an angle sensor operating according to the inductive principle to include energy transmission and information transmission. It is a further object of the invention to propose a steering-wheel module that combines the three functional groups of an energy-transmission device, an information-transmission device and an angle-sensor mechanism into a compact, multi-part, inexpensive component.

In accordance with the invention, these objects are accomplished by the characterizing features of the independent claims. The dependent claims disclose further advantageous embodiments.

A module that, in accordance with the invention, includes an angle-sensor mechanism, an energy-transmission device and an information-transmission device comprises at least two circuit boards. One circuit board forms the stator with respect to the angle-sensor mechanism, while the other forms the rotor with respect to the mechanism. The stator includes the primary coil for the angle-sensor mechanism, as well as an exciting coil for the transmission of energy and information. The rotor includes the secondary coil of the angle-sensor mechanism, as well as a receiver coil for the transmission of energy and information. The exciting coil and the receiver coil are disposed in circular fashion on the respective circuit board, thereby creating a coupling for the exciting coil and receiver coil that is independent of the angle. The exciting coil and the receiver coil are used for transmitting both energy and information. The energy transmission is typically effected with a medium frequency of, for example, 25 kHz. A modulation is superposed on this medium frequency for transmitting information. Various modulation methods are feasible, such as HF (high-frequency) modulation, amplitude modulation or phase modulation.

A module in accordance with the invention, which integrates the angle-sensor mechanism, the energy-transmission device and the information-transmission device, offers the following advantages in connection with the use of modern construction and connection technology:

The structural size of the module can be kept small at the transmitted powers of up to about 10 W; in particular, ferrite cores are not required for focusing the magnetic flux.

The module is expandable, and the information-transmission system permits a large number of additional functions.

The module operates in contactless fashion, and is therefore unsusceptible to wear. In particular, the module requires no sliding contacts.

The module is durable.

The module can be produced with circuit-board technology, and is therefore suitable for mass production, which makes it inexpensive to produce.

The module according to the invention is advantageously specially adapted to the requirements of the respective installation site. In the configuration of the module as an integrated steering-wheel module in a motor vehicle, the circuit-board technology advantageously allows the module to be adapted to different vehicles, such as trucks having 24-V on-board networks, passenger vehicles having 42 V on-board. networks or passenger vehicles having 12 V on-board networks. Other motor vehicles with different types of on-board networks are also conceivable. The stator-side part of the steering-wheel module is permanently built into the motor vehicle, e.g., secured to the chassis of the vehicle, or secured to the steering-shaft jacket tube. The rotor-side part of the steering-wheel module must be mounted in the immediate vicinity of the stator. If the stator-side part of the steering-wheel module is secured to the steering-shaft jacket tube, the rotor-side part of the steering-wheel module is secured to the steering shaft, so the rotor-side part of the steering-wheel module can be rotated relative to the stator-side part of the module.

In an advantageous embodiment of the module according to the invention, the primary and secondary coils of the angle-sensor mechanism, and the exciting coils and the receiver coils of the energy- and information-transmission devices, are embodied as conductor tracks on the surface of the circuit boards. In an especially preferred embodiment, the primary coil, secondary coil, exciting coil and receiver coil are embodied as a printed circuit. This technology has performed well for angle-sensor mechanisms, that is, for the primary and secondary coils. Surprisingly, preliminary tests of the invention have shown that, for the purpose of transmitting power and information, that is, for the exciting and receiver coils, powers of up to, for example, 10 Watts can be transmitted without difficulty with coils produced with circuit-board technology, or with printed-circuit coils. This is all the more surprising because, contrary to popular belief, ferrite cores that focus on the magnetic field can be omitted in the power transmission. A power of about 1 to 2 Watts is typically required for deploying an airbag built into the steering wheel, for example. The power that can be transmitted with printed circuits is therefore sufficient for reliably igniting a vehicle airbag with the integrated steering-wheel module. Supplying energy to driver's-side airbags is an especially preferred application of the module according to the invention.

In a further preferred embodiment, the supply systems for the angle-sensor mechanism and the energy- and information-transmission devices are already integrated onto the circuit boards of the module according to the invention. In this case, so-called DC/AC converters, current transformers for converting direct current into alternating current, are provided on the stator side of the circuit boards, while AC/DC converters are integrated on the rotor side. Digital modulators/demodulators are integrated on both the stator and rotor sides for transmitting information. In a preferred embodiment, the modulators/demodulators are capable of transmitting a plurality of transmission channels. In a preferred embodiment, five channels can be transmitted, for example; in a further embodiment, ten channels can be transmitted, for example, while in another embodiment, 30 channels can be transmitted, for example. The number of channels depends on the number of connected devices that must be supplied with information independently of one another, or that must supply information independently of one another. An especially preferred application of the module according to the invention, in addition to the aforementioned supply of energy to driver's-side airbags, is the transmission of control commands from actuation elements integrated into the steering wheel to the associated devices, such as switches for controlling and operating car radios or CD (compact disc) players.

Figure 2:
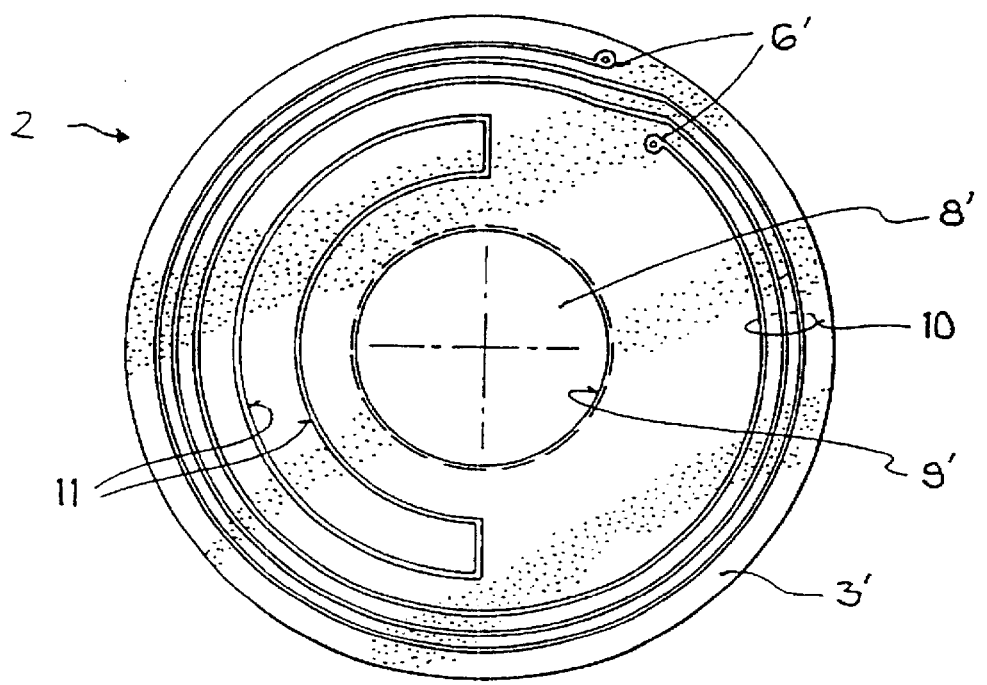
Figure 3:
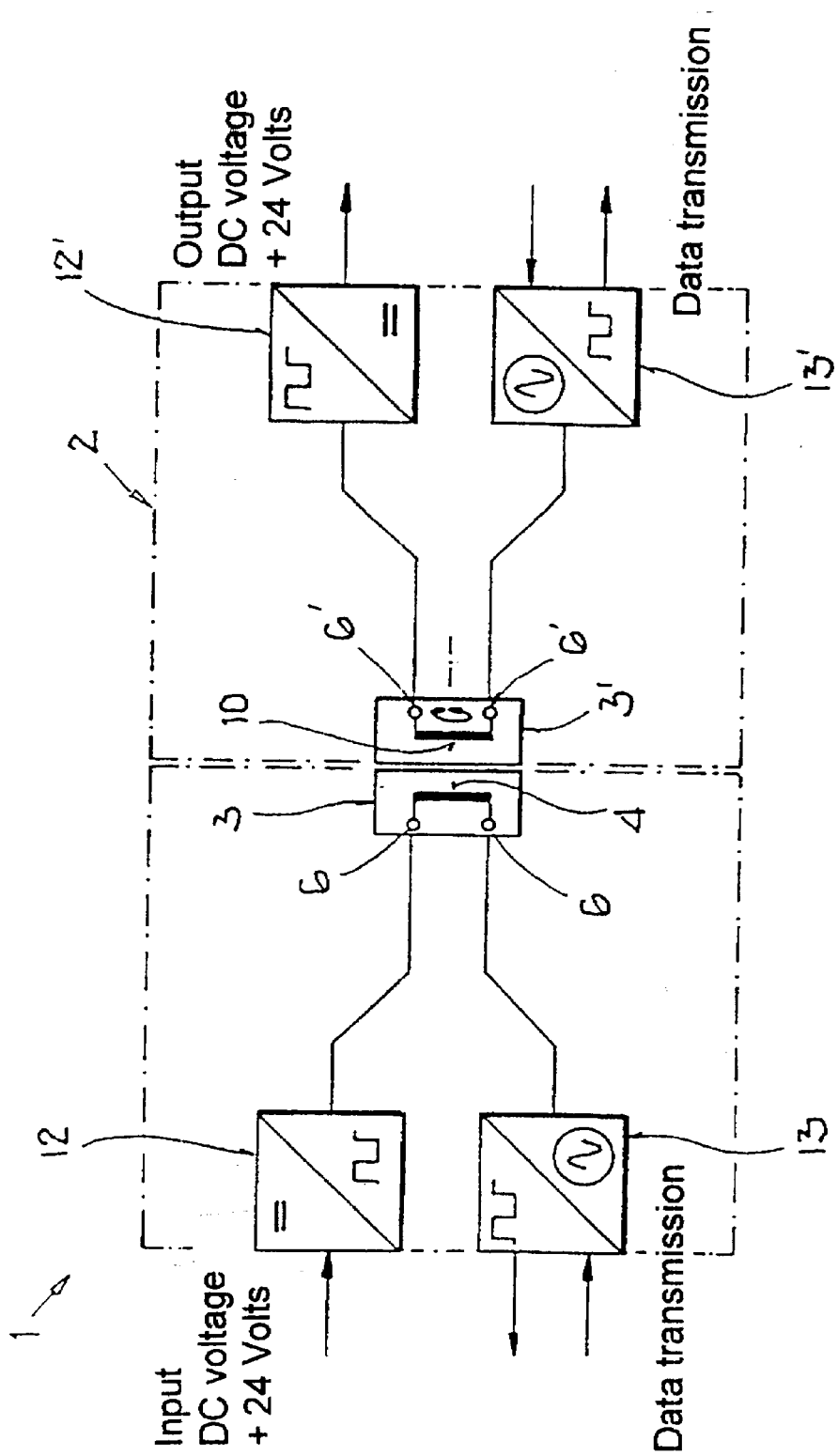
Figure 4:
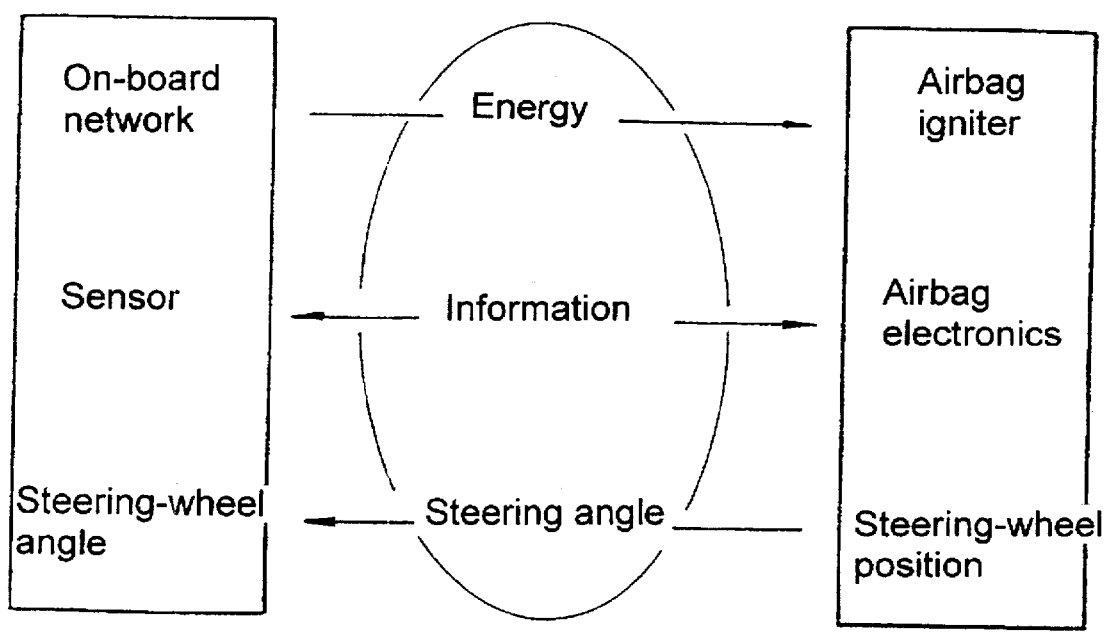
Figure 5:
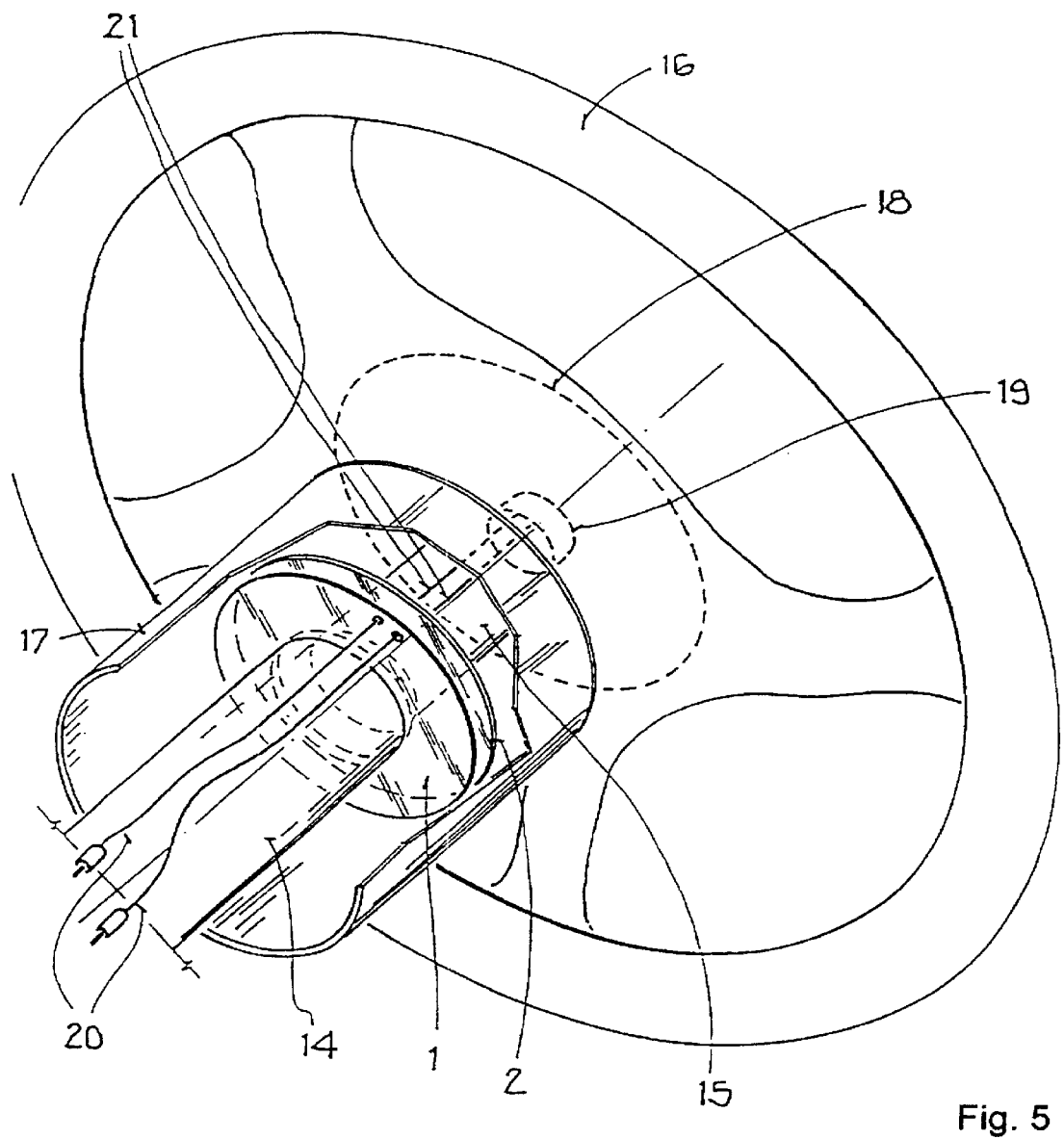

An exemplary embodiment of the invention is illustrated in the drawings and explained in detail below. Shown are in:

FIG. 1 a plan view of the stator-side component of the module in accordance with the invention, with an exciting coil and a primary coil produced with circuit-board technology or as a printed circuit;

FIG. 2 a plan view of the rotor-side component of the module in accordance with the invention, with a receiver coil and a short-circuited secondary coil produced with circuit-board technology or as a printed circuit;

FIG. 3 a schematic layout of the module in accordance with the invention, with connected supply devices for transmitting energy and information;

FIG. 4 a functional diagram of the module in accordance with the invention, with an exemplary application as a steering-wheel module; and FIG. 5 a schematic, three-dimensional representation of a truck steering wheel with the installed module in accordance with the invention.

FIG. 1 is a plan view of the stator-side component of the module of the invention, with an exciting coil and a primary coil that are produced with circuit-board technology or as a printed circuit. The stator-side component 1 of the module in accordance with the invention includes an exciting coil 4, which is formed by conductor tracks on a substrate 3, and two primary coils 5, which are likewise formed from conductor tracks. The exciting coil typically comprises three to ten windings, and is connected to the supply units for transmitting energy and information, as shown in FIG. 3, via the terminal lugs 6. In the illustrated embodiment, the exciting coil 4 comprises three windings. If a larger number of windings is required, such as 20 windings, for transmitting greater powers, the windings can be mounted to both the front and rear sides of the substrate. For example, ten windings can be mounted to the front side of the substrate, and ten windings can be mounted to the rear side of the substrate. The terminal lugs 7 connect the two primary coils 5 from the rear side of the substrate to an evaluation unit, not shown, for ascertaining the angular position. FIG. 1 depicts the contacting of the primary coils in dashed lines. In the embodiment according to FIG. 1, only two primary coils are shown; these have a semi-circular shape, and respectively cover an angular region of 180°. There are, however, other feasible arrangements and embodiments for the primary coils that are known from the prior art. In particular, it is possible to divide the coils into a larger number of angular segments. The primary coils are typically operated with an AC voltage of 10 kHz to 80 kHz in a voltage range between 12 and 50 V. In principle, the primary coil can also be operated with an AC voltage of 1 MHz. The substrate diameter is typically in a range between 60 and 100 mm. Larger or smaller diameters are also feasible. In the center, the substrate has a circular recess 8, to which a phase 9 indicated by a dashed line is mounted. The recess 8 serves in mounting the stator-side component to the jacket of the steering shaft, as shown by way of example in FIG. 5.

FIG. 2 is a plan view of the rotor-side component of the module according to the invention, with a receiver coil and a short-circuited secondary coil produced with circuit-board technology or as a printed circuit. The rotor-side component 2 includes a receiver coil 10, which is formed by conductor tracks on a substrate 3', and is connected via the terminal lugs 6' to supply devices for transmitting energy and information, as shown in FIG. 3. A short-circuited secondary coil 11, likewise formed from conductor tracks, constitutes the rotor-side component of the angle sensor. In the illustrated embodiment, to provide a better overview, the secondary coil is configured as a semi-circle that can cover an angular segment of 180°. More detailed divisions of angular segments, as are known for inductive angle sensors, are feasible and provided. A recess 8', to which a phase 9' shown in a dashed line is mounted, serves in fastening the rotor-side component to the steering shaft, as shown by way of example in FIG. 5. The exciting coil typically comprises three to ten windings. The windings can be mounted to both the front and rear sides of the substrate. If no transformer ratio other than one is to be selected for transmitting energy, the number of windings of the receiver coil is matched to the number of windings of the exciting coil, that is, the exciting coil and the receiver coil possess the same number of windings.

FIG. 3 shows a schematic layout of the module in accordance with the invention, with connected supply devices for transmitting energy and information. At the stator-side component 1, a DC/AC converter 12 and a digital modulator/demodulator 13 are connected to the terminal lugs 6 on the substrate 3. In this embodiment, the DC/AC converter converts the 24 V DC voltage of the truck's on-board network into a 25-kHz AC voltage for energy transmission. The modulator/demodulator 13 superposes a digitized signal on the carrier frequency for the energy transmission. With the digitized signal, information is transmitted in both directions between the stator-side component 1 and the rotor-side component 2. All of the known modulation methods, such as HF modulation, amplitude modulation and phase modulation, can be used for modulating the carrier signal. The stator-side supply devices 12, 13 have their counterparts 12', 13' on the rotor-side component 2. An AC/DC converter converts the transmitted AC voltage received by the receiver coil 10 back into a 24 V DC voltage. A demodulator/modulator 13' decodes the signal superposed on the carrier frequency back into a digital signal that can be further processed, for example, by the deployment electronics of a connected airbag system, as shown by way of example in FIGS. 4 and 5. In a preferred embodiment of the module, the supply devices 12, 12', 13, 13' are disposed on the circuit-board substrates 3, 3'. In another preferred embodiment, the supply devices are disposed separately from the substrates 3, 3'. The latter embodiment is advantageous if only a very limited amount of space is available for the module according to the invention.

FIG. 4 is a functional diagram of the module in accordance with the invention, in an exemplary application as a steering-wheel module, as shown in FIG. 5. The module in accordance with the invention is represented schematically as an ellipse, and performs the following three functions:

energy transmission, symbolically represented by an arrow marked "energy";

information transmission, symbolically represented by a double-headed arrow marked "information"; and steering-angle transmission, symbolically represented by an arrow marked "steering angle."

With the aid of the energy transmission from the on-board network, the airbag electronics in the steering-wheel housing are activated and supplied with energy. The airbag ignition is also preloaded. With the information transmission, a data transmission is effected between a crash sensor and the ignition device of the airbag, so the airbag is ignited if the crash sensor generates a corresponding deployment signal. As the third function, the instantaneous steering-wheel position is determined. This requires no transmission of information in the aforementioned sense, because the angle-sensor mechanism determines the steering-wheel angle on the primary side exclusively with the feedback of the short-circuited secondary coil to the primary coil. In so-called drive-by-wire or steer-by-wire systems, a steering-wheel angle determined in this manner can be converted into control commands for the actuators for setting the steered wheels. The steering angle of the steered wheels can then be controlled with the module of the invention using the steering angle of the steering wheel.

FIG. 5 is a schematic, three-dimensional representation of a truck steering wheel with a built-in module according to the invention. The stator-side component 1 is secured to the jacket tube 14 of the steering shaft 15, while the rotor-side component 2 is secured to the steering shaft 15 itself. The steering wheel 16 is likewise secured to the steering shaft. The stator- and rotor-side components 1, 2 are covered by a protective steering-wheel housing 17. An airbag 18 and an airbag igniter 19 are further accommodated in the steering-wheel housing in a manner known per se. Electrical connecting lines 20 connect the stator-side component 1 to the on-board network for energy supply, and to communication devices, not shown, for signal transmission. In particular, the stator-side component is directly or indirectly connected to so-called crash sensors or other acceleration sensors that generate a characteristic deployment signal for igniting the airbag. This signal is transmitted to the rotor-side component 2 via a transmission channel described in FIG. 3, and conducted further to the airbag igniter 19 via connecting lines 21, so the airbag 18 is deployed and inflated.

What is claimed is:

1. A module having an angle-sensor mechanism, a contactless energy-transmission device and a contactless information-transmission device,
    having a stator-side component (1), in which at least one primary coil (5) for determining an angular position is disposed on a substrate (3), and at least one exciting coil (4) for contactless energy and information transmission is also disposed on the substrate;
    and having a rotor-side component (2), in which at least one short-circuited secondary coil for determining the angular position is disposed on a substrate (3'), and at least one receiver coil (10) for contactless energy and information transmission is also disposed on the substrate.

2. The module according to claim 1, characterized in that the exciting coil (4) and the receiver coil (10) are embodied as conductor tracks on a circuit board or are embodied as a printed circuit.

3. The module according to claim 1, characterized in that supply devices for energy transmission (12/12') and supply devices for information transmission (13, 13') are integrated onto the substrates (3, 3').

4. The module according to claim 3, characterized in that the supply devices (12, 12') for energy transmission are DC/AC converters on the stator side, and are AC/DC converters on the rotor side.

5. A steering-wheel module for motor vehicles having a module according to claim 4, characterized in that the stator-side component (1) is secured to the jacket tube (14) of the steering shaft (15), and the rotor-side component (2) is secured to the steering shaft (15).

6. The module according to claim 3, characterized in that the supply devices (13, 13') for information transmission are modulators/demodulators.

7. A steering-wheel module for motor vehicles having a module according to claim 6, characterized in that the stator-side component (1) is secured to the jacket tube (14) of the steering shaft (15), and the rotor-side component (2) is secured to the steering shaft (15).

8. The module according to claim 3, characterized in that the supply devices (13) for information transmission make use of a plurality of channels for transmitting information.

9. A steering-wheel module for motor vehicles having a module according to claim 8, characterized in that the stator-side component (1) is secured to the jacket tube (14) of the steering shaft (15), and the rotor-side component (2) is secured to the steering shaft (15).

10. A steering wheel for a motor vehicle, having an airbag (18) and an airbag igniter (19), which are disposed in the steering-wheel housing (17), and having a steering-wheel module according to claim 9, wherein
    at least one transmission channel connects actuation elements integrated into the steering wheel, particularly switches, with the devices associated with these elements, particularly car radios or CD players.

11. A steering wheel for a motor vehicle, having an airbag (18) and an airbag igniter (19), which are disposed in the steering-wheel housing (17) and having a steering-wheel module according to claim 9, wherein
    a transmission channel connects the crash sensor to the airbag igniter (19),
    and at least one transmission channel connects the actuation elements integrated into the steering wheel, particularly switches, to the devices associated with these elements, particularly car radios or CD players.

12. A steering-wheel module for motor vehicles having a module according to claim 3, characterized in that the stator-side component (1) is secured to the jacket tube (14) of the steering shaft (15), and the rotor-side component (2) is secured to the steering shaft (15).

13. The module according to claim 1, characterized in that the supply devices (12, 12') for energy transmission and the supply devices (13, 13') for information transmission are disposed separately from the substrates (3, 3').

14. A steering-wheel module for motor vehicles having a module according to claim 1, characterized in that the stator-side component (1) is secured to the jacket tube (14) of the steering shaft (15), and the rotor-side component (2) is secured to the steering shaft (15).

15. A steering wheel for a motor vehicle, having an airbag (18) and an airbag igniter (19), which are disposed in the steering-wheel housing (17), and having a steering-wheel module according to claim 14, wherein
    the stator-side component (1) is connected via connecting lines (20) to an on-board network and a crash sensor, and
    the rotor-side component (2) is connected via connecting lines (21) to the airbag igniter (19).

* * * * *